(12) United States Patent
Cheng et al.

(10) Patent No.: US 8,267,567 B2
(45) Date of Patent: Sep. 18, 2012

(54) BACKLIGHT MODULE, BEZEL ASSEMBLY APPLIED TO BACKLIGHT MODULE, AND DISPLAY DEVICE

(75) Inventors: Ching-Hung Cheng, Hsin-Chu (TW); Hsin-Chang Chiang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 455 days.

(21) Appl. No.: 12/687,134

(22) Filed: Jan. 14, 2010

(65) Prior Publication Data
US 2011/0134661 A1 Jun. 9, 2011

(30) Foreign Application Priority Data
Dec. 3, 2009 (TW) .............................. 98141340 A (51) Int. Cl.
F21V 7/04 (2006.01)
F21V 15/01 (2006.01)
(52) U.S. Cl. ........... 362/633; 362/615; 362/634; 349/58
(58) Field of Classification Search .................. 362/615, 362/632–634; 349/58, 61
See application file for complete search history.

(56) References Cited

U.S. PATENT DOCUMENTS
2010/0188599 A1* 7/2010 Arihara ........................... 349/60

FOREIGN PATENT DOCUMENTS
| CN | 100414382 C | 8/2008 |
|----|-------------|--------|
| CN | 201149211 Y | 11/2008 |
| CN | 100445841 C | 12/2008 |
| CN | 101344663 A | 1/2009 |
| TW | 200619768 | 6/2006 |
| TW | I307435 | 3/2009 |

* cited by examiner

Primary Examiner — Karabi Guharay
(74) Attorney, Agent, or Firm — Winston Hsu; Scott Margo (57) ABSTRACT

A bezel assembly, which is applied to a backlight module, includes a first bezel and a second bezel. The first bezel has a first side wall and a second side wall. A first hole structure is formed on a corner between the first and second side walls. The second bezel has a third side wall. A second hole structure and a third hole structure are formed on opposite sides of the third side wall. When the first bezel is disposed in the second bezel, the third side wall can completely cover the first hole structure of the first bezel from the outside of the first bezel, and the second and third hole structures are close to the first hole structure.

23 Claims, 8 Drawing Sheets

BACKLIGHT MODULE, BEZEL ASSEMBLY APPLIED TO BACKLIGHT MODULE, AND DISPLAY DEVICE

BACKGROUND OF THE INVENTION

1. Field of the Invention

The invention relates to a backlight module and, more particularly, to a bezel assembly, which is adapted to a backlight module, capable of preventing particles from entering the backlight module via a hole structure formed on a plastic bezel and avoiding uneven extrusion while a metal bezel is manufactured by metal forming process.

2. Description of the Prior Art

Figure 1:
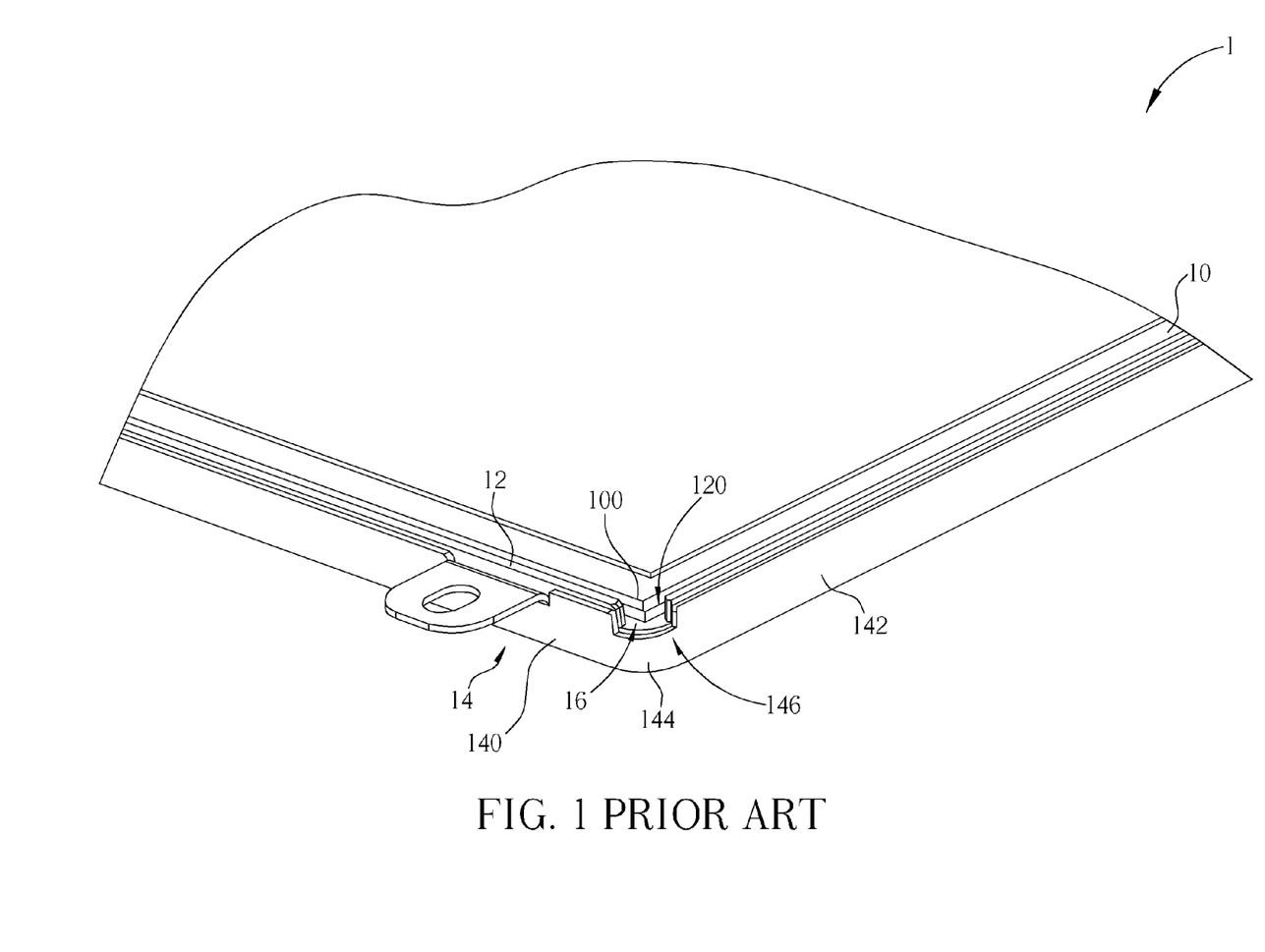
FIG. 1 is a schematic diagram illustrating parts of a conventional backlight module.
Figure 2:
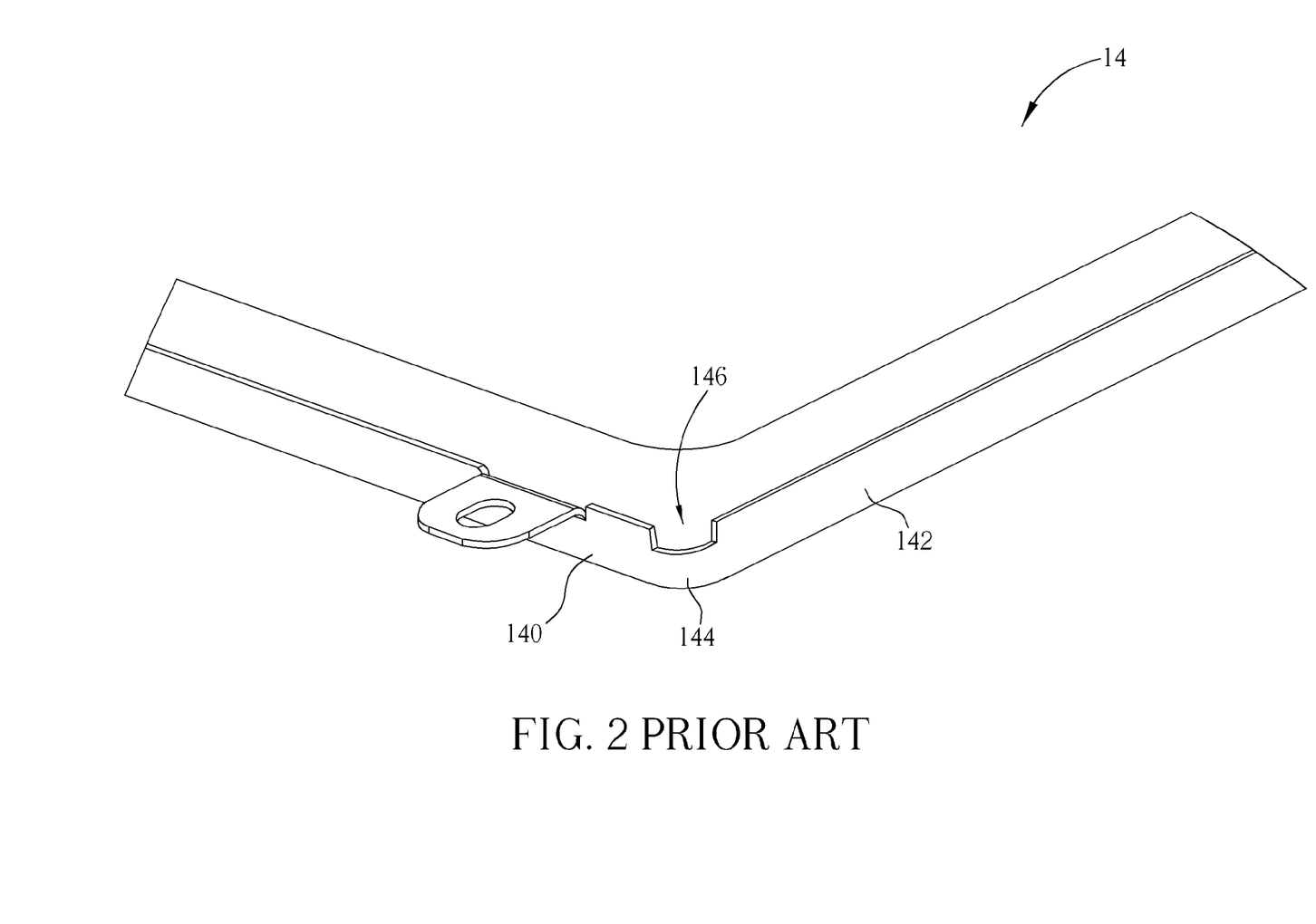
FIG. 2 is a perspective view illustrating the metal bezel shown in FIG. 1.

Referring to FIGS. 1 and 2, FIG. 1 is a schematic diagram illustrating parts of a conventional backlight module 1, and FIG. 2 is a perspective view illustrating the metal bezel 14 shown in FIG. 1. As shown in FIG. 1, the backlight module 1 comprises a light guide plate 10, a plastic bezel 12 and a metal bezel 14. The light guide plate 10 is disposed in the plastic bezel 12, and the plastic bezel is disposed in the metal bezel. In general, there is usually a hole structure 120 formed on a corner of the plastic bezel 12. When the light guide plate 10 is assembled with the plastic bezel 12, the hole structure 120 can prevent a corner 100 of the light guide plate 10 from cracking.

As shown in FIG. 2, the metal bezel has two side walls 140 and 142, which are formed by metal forming process. To avoid uneven extrusion occurring at a corner 144 between the side walls 140 and 142 during metal forming process, a hole structure 146 is usually formed on the corner 144 between the side walls 140 and 142 in advance, and then the side walls 140 and 142 are formed by metal forming process. As shown in FIG. 1, when the light guide plate 10 together with the plastic bezel 12 is assembled with the metal bezel 14, the hole structure 146 of the metal bezel 14 just overlaps the hole structure 120 of the plastic bezel 12, such that the corner 100 of the light guide plate 10 is exposed therein. Since there is a gap 16 between the corner 100 of the light guide plate 10 and the plastic bezel 12, some particles (e.g. dust) in the air may enter the backlight module 1 via the gap 16. Consequently, the backlight module 1 may fail or break down.

SUMMARY OF THE INVENTION

Therefore, an objective of the invention is to provide a backlight module and a bezel assembly thereof. A side wall is formed on a metal bezel and used to cover a hole structure on a plastic bezel, so as to prevent particles from entering the backlight module via the hole structure on the plastic bezel. Furthermore, two hole structures are formed on opposite sides of the side wall, respectively, so as to avoid uneven extrusion while the metal bezel is manufactured by metal forming process.

According to one embodiment of the invention, a bezel assembly, which is adapted to a backlight module, comprises a first bezel and a second bezel. In practical applications, the first bezel may be made of plastic and the second bezel may be made of metal. The first bezel has a first side wall and a second side wall. A first hole structure is formed on a corner between the first and second side walls. The second bezel has a third side wall. A second hole structure and a third hole structure are formed on opposite sides of the third side wall. When the first bezel is disposed in the second bezel, the third side wall can completely cover the first hole structure from an outside of the first bezel, and the second and third hole structures are close to the first hole structure.

According to another embodiment of the invention, a backlight module comprises a light guide plate and the aforesaid bezel assembly. When the light guide plate together with the first bezel is disposed in the second bezel, the third side wall can completely cover the first hole structure of the first bezel, so as to prevent particles from entering the backlight module via the first hole structure of the first bezel.

According to another embodiment of the invention, a display device comprises a casing, the aforesaid backlight module and a display panel. The backlight module and the display panel are disposed in the casing, and the display panel is disposed over the backlight module.

As mentioned in the above, the invention utilizes the third side wall of the second bezel to cover the first hole structure of the first bezel, so as to prevent particles from entering the backlight module via the first hole structure of the first bezel. Moreover, the second hole structure and the third hole structure are formed on opposite sides of the third side wall, respectively, so as to avoid uneven extrusion while the third side wall is manufactured by metal forming process.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
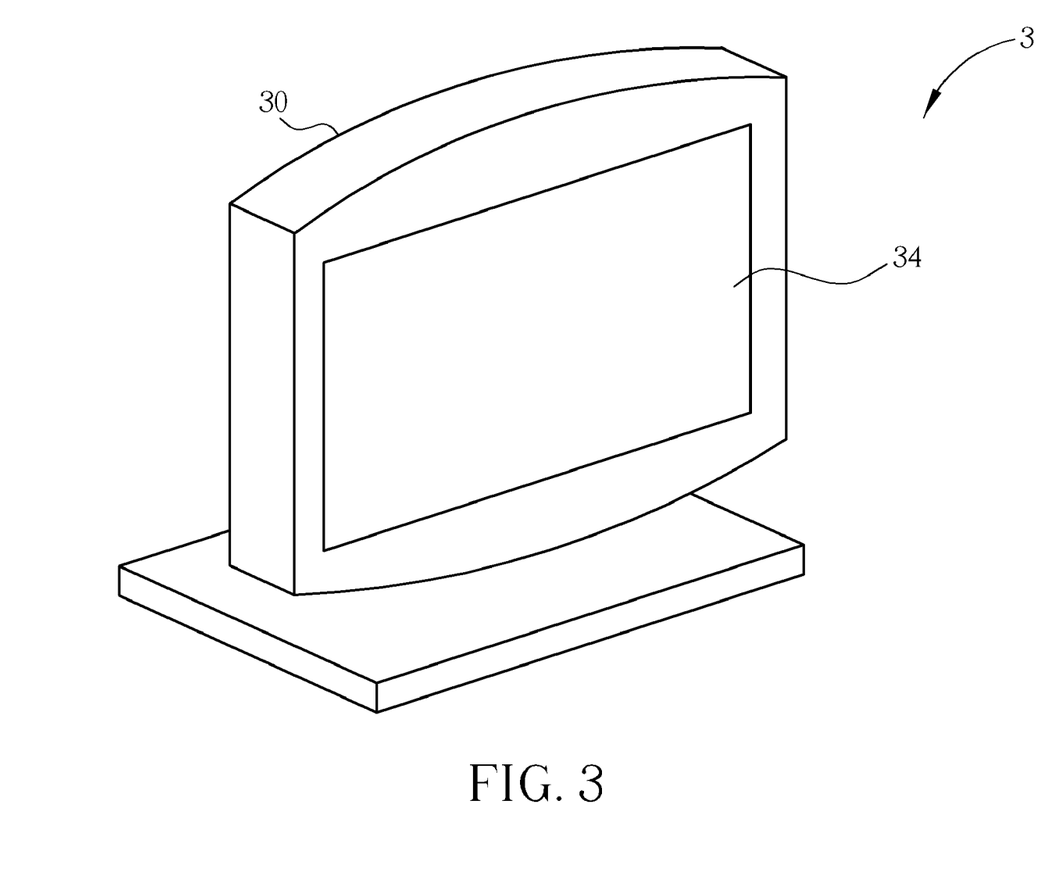
FIG. 3 is a schematic diagram illustrating a display device according to one embodiment of the invention.
Figure 4:
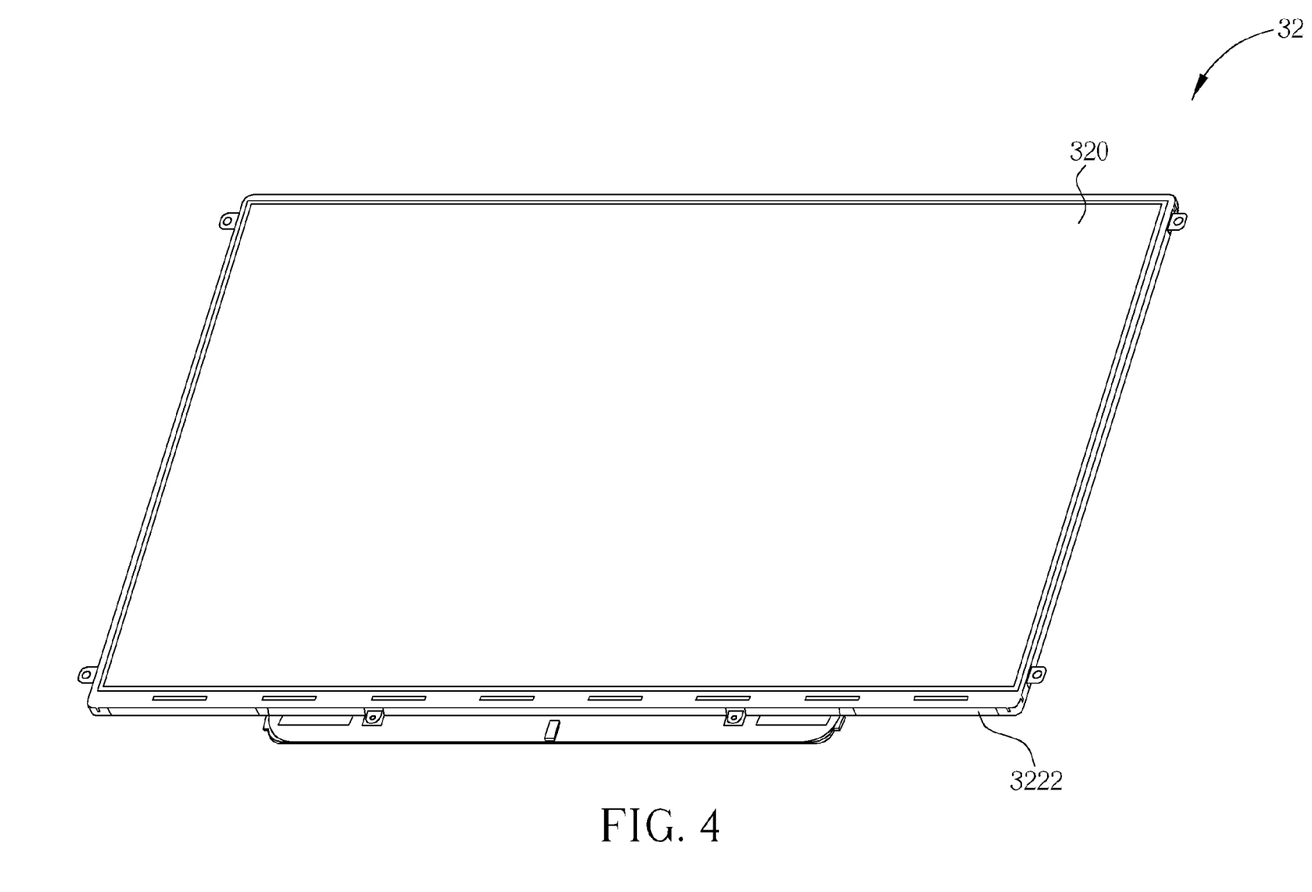
FIG. 4 is a schematic diagram illustrating a backlight module according to one embodiment of the invention.

Referring to FIGS. 3 and 4, FIG. 3 is a schematic diagram illustrating a display device 3 according to one embodiment of the invention, and FIG. 4 is a schematic diagram illustrating a backlight module 32 according to one embodiment of the invention. As shown in FIGS. 3 and 4, the display device 3 comprises a casing 30, a backlight module 32 and a display panel 34. The backlight module 32 and the display panel 34 are disposed in the casing 30, and the display panel 34 is disposed over the backlight module 32. In practical applications, the display device 3 may be a liquid crystal display (LCD) and the display panel 34 may be an LCD panel. Furthermore, a light source of the backlight module 32 may be a fluorescent tube or light emitting diode (LED). It should be noted that the principles of the backlight module 32 and the display panel 34 can be achieved by one skilled in the art easily, and it will not be depicted here again.

Figure 5:
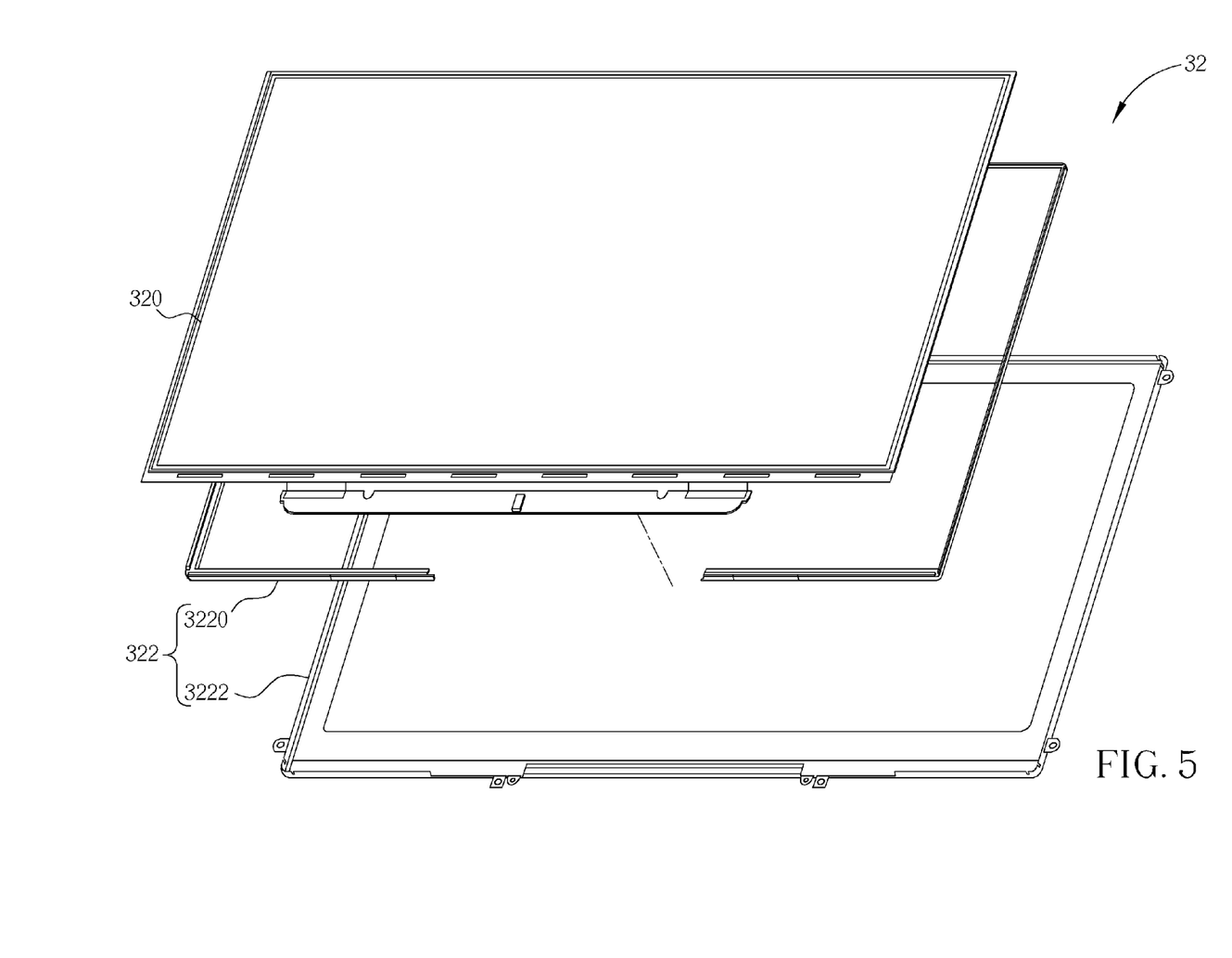
FIG. 5 is an exploded view illustrating the backlight module shown in FIG. 4.

Referring to FIG. 5, FIG. 5 is an exploded view illustrating the backlight module 32 shown in FIG. 4. As shown in FIG. 5, the backlight module 32 comprises a light guide plate 320 and a bezel assembly 322, wherein the bezel assembly 322 comprises a first bezel 3220 and a second bezel 3222. In practical applications, the first bezel 3220 may be made of plastic and the second bezel 3222 may be made of metal.

Figure 6:
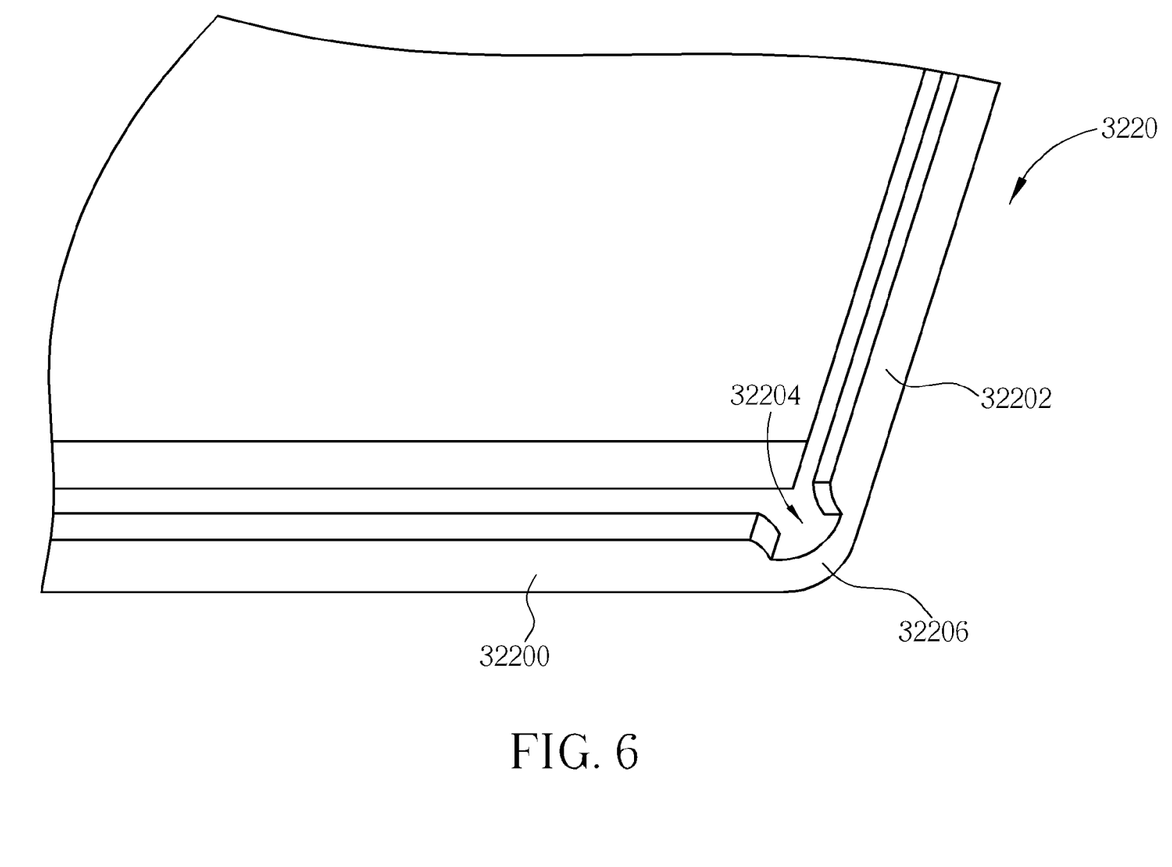
FIG. 6 is a schematic diagram illustrating parts of the first bezel shown in FIG. 5.
Figure 7:
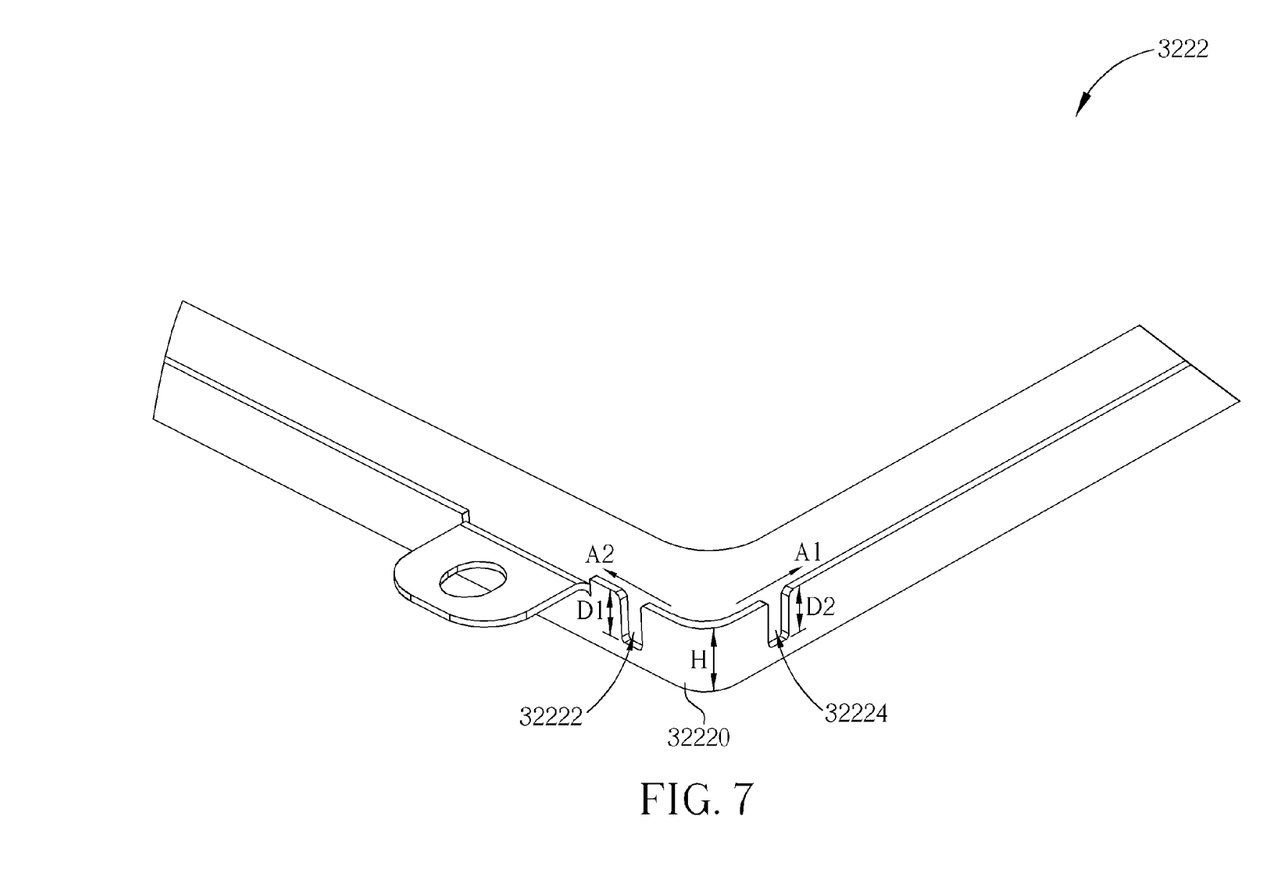
FIG. 7 is a schematic diagram illustrating parts of the second bezel shown in FIG. 5.
Figure 8:
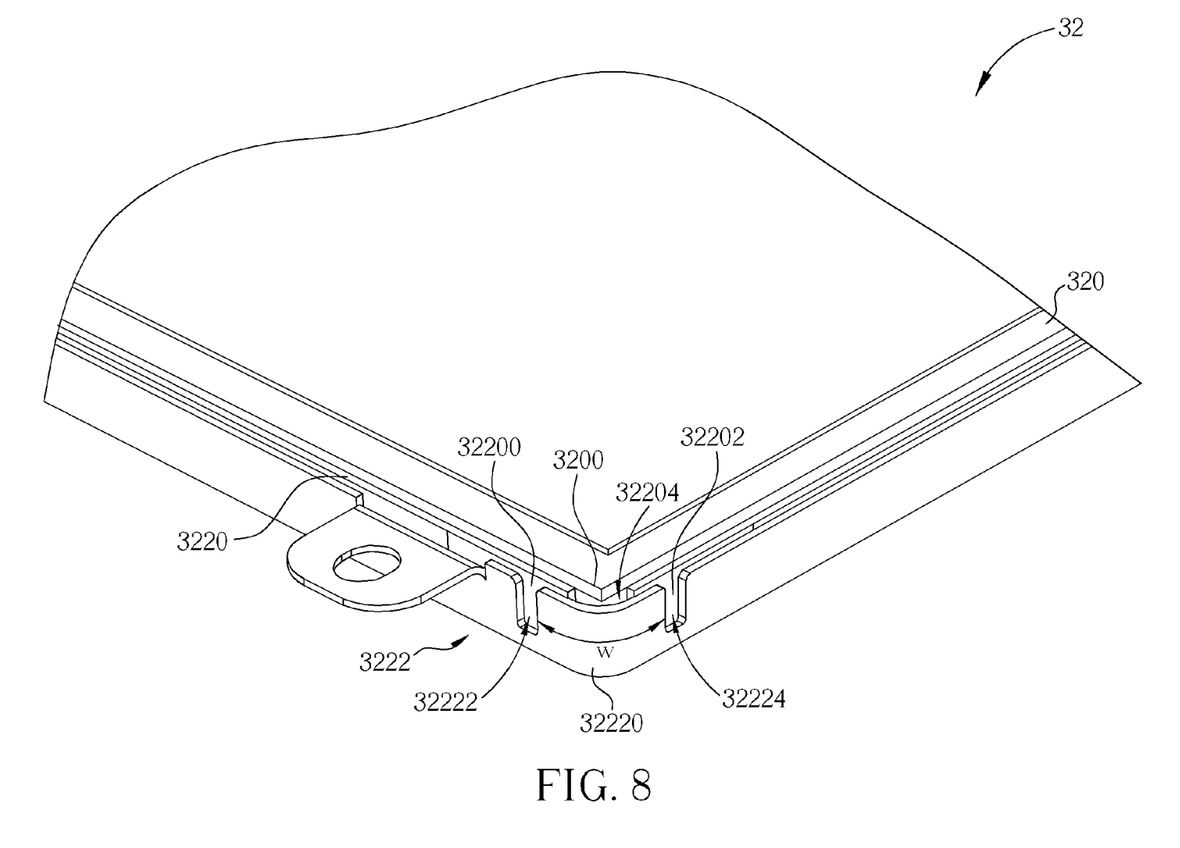
FIG. 8 is a schematic diagram illustrating parts of the backlight module shown in FIG. 4.

Referring to FIGS. 6 to 8, FIG. 6 is a schematic diagram illustrating parts of the first bezel 3220 shown in FIG. 5, FIG. 7 is a schematic diagram illustrating parts of the second bezel 3222 shown in FIG. 5, and FIG. 8 is a schematic diagram illustrating parts of the backlight module 32 shown in FIG. 4. As shown in FIG. 6, the first bezel 3220 has a first side wall 32200 and a second side wall 32202. A first hole structure 32204 is formed on a corner 32206 between the first and second side walls 32200 and 32202. As shown in FIG. 8, the light guide plate 320 is disposed in the first bezel 3220 and a corner 3200 of the light guide plate 320 is exposed in the first hole structure 32204. When the light guide plate 320 is assembled with the first bezel 3220, the first hole structure 32204 can prevent the corner 3200 of the light guide plate 320 from cracking. As mentioned in the above, there will be a gap (as the gap 16 shown in FIG. 1) between the corner 3200 of the light guide plate 320 and the first bezel 3220.

As shown in FIG. 7, the second bezel 3222 has a third side wall 32220, and a second hole structure 32222 and a third hole structure 32224 are formed on opposite sides of the third side wall 32220. In practical applications, the second bezel 3222 may be a metal bezel formed by metal forming process. To avoid uneven extrusion occurring at the third side wall 32220 during metal forming process, the second and third hole structures 32222 and 32224 are formed on opposite sides of the third side wall 32220 in advance, and then the third side wall 32220 is formed by metal forming process. When bending the third side wall 32220, the material of the third side wall 32220 will extend toward the second and third hole structures 32222 and 32224 on opposite sides of the third side wall 32220, such that uneven extrusion will not occur. In this embodiment, a depth D1 if the second hole structure 32222 maybe larger than or equal to a half of a height H of the third side wall 32220. Also, a depth D2 of the third hole structure 32224 may be larger than or equal to a half of the height H of the third side wall 32220. Accordingly, uneven extrusion can be avoided effectively while bending the third side wall 32220 by metal forming process.

In this embodiment, the third side wall 32220 may be arc-shaped and both sides of the third side wall 32220 extend toward two non-parallel directions A1 and A2, respectively, wherein an angle between the directions A1 and A2 is 90 degrees, as shown in FIG. 7. In another embodiment, the third side wall 32220 may also consist of two perpendicular walls.

As shown in FIG. 8, when the light guide plate 320 together with the first bezel 3220 is disposed in the second bezel 3222, the third side wall 32220 can completely cover the first hole structure 32204 from an outside of the first bezel 3220. In other words, the third side wall 32220 can completely cover the gap (as the gap 16 shown in FIG. 1) between the corner 3200 of the light guide plate 320 and the first bezel 3220, and the third side wall 32220 will not contact the corner 3200 of the light guide plate 320. Furthermore, the first side wall 32200 of the first bezel 3220 can completely cover the second hole structure 32222 from an inside of the second bezel 3222, and the second side wall 32202 of the first bezel 3220 can completely cover the third hole structure 32224 from the inside of the second bezel 3222. Accordingly, the invention can prevent particles in the air from entering the backlight module 32 effectively.

As shown in FIG. 8, a width W of the third side wall 32220 is determined by the second and third hole structures 32222 and 32224 on opposite sides of the third side wall 32220. In this embodiment, the width W of the third side wall 32220 should be able to completely cover the first hole structure 32204 of the first bezel 3220, and the second and third hole structures 32222 and 32224 has to be formed on specific positions, so as to avoid uneven extrusion when the third side wall 32220 is formed by metal forming process. Therefore, when the light guide plate 320 together with the first bezel 3220 is disposed in the second bezel 3222, the second and third hole structures 32222 and 32224 should be close to the first hole structure 32204. Accordingly, the third side wall 32220 can completely cover the first hole structure 32204 of the first bezel 3220, and uneven extrusion will not occur when the third side wall 32220 is formed by metal forming process.

It should be noted that, in practical applications, the structure of each corner of the second bezel 3222 is the same as that shown in FIG. 7 with corresponding description, and it will not be depicted here again.

Compared to the prior art, the invention utilizes the third side wall of the second bezel to cover the first hole structure of the first bezel, so as to prevent particles from entering the backlight module via the first hole structure of the first bezel. Moreover, the second hole structure and the third hole structure are formed on opposite sides of the third side wall, respectively, so as to avoid uneven extrusion while the third side wall is manufactured by metal forming process. In other words, to avoid uneven extrusion occurring at the third side wall during metal forming process, the second and third hole structures and are formed on opposite sides of the third side wall in advance, and then the third side wall is formed by metal forming process. When bending the third side wall, the material of the third side wall will extend toward the second and third hole structures and on opposite sides of the third side wall, such that uneven extrusion will not occur.

Those skilled in the art will readily observe that numerous modifications and alterations of the device and method may be made while retaining the teachings of the invention.

What is claimed is:

1. A backlight module comprising:
a light guide plate;
a first bezel having a first side wall and a second side wall, a first hole structure being formed on a corner between the first and second side walls, the light guide plate being disposed in the first bezel; and
a second bezel having a third side wall, a second hole structure and a third hole structure being formed on opposite sides of the third side wall, wherein when the first bezel is disposed in the second bezel, the third side wall completely covers the first hole structure from an outside of the first bezel, and the second and third hole structures are close to the first hole structure.

2. The backlight module of claim 1, wherein a depth of the second hole structure is larger than or equal to a half of a height of the third side wall.

3. The backlight module of claim 1, wherein a depth of the third hole structure is larger than or equal to a half of a height of the third side wall.

4. The backlight module of claim 1, wherein the first side wall completely covers the second hole structure from an inside of the second bezel, and the second side wall completely covers the third hole structure from an inside of the second bezel.

5. The backlight module of claim 1, wherein the first bezel is made of plastic.

6. The backlight module of claim 1, wherein the second bezel is made of metal.

7. The backlight module of claim 1, wherein a corner of the light guide plate is exposed in the first hole structure.

8. The backlight module of claim 1, wherein the third side wall is arc-shaped and both sides of the third side wall extend toward two non-parallel directions, respectively.

9. A bezel assembly adapted to a backlight module, the bezel assembly comprising:
  a first bezel having a first side wall and a second side wall, a first hole structure being formed on a corner between the first and second side walls; and
  a second bezel having a third side wall, a second hole structure and a third hole structure being formed on opposite sides of the third side wall, wherein when the first bezel is disposed in the second bezel, the third side wall completely covers the first hole structure from an outside of the first bezel, and the second and third hole structures are close to the first hole structure.

10. The bezel assembly of claim 9, wherein a depth of the second hole structure is larger than or equal to a half of a height of the third side wall.

11. The bezel assembly of claim 9, wherein a depth of the third hole structure is larger than or equal to a half of a height of the third side wall.

12. The bezel assembly of claim 9, wherein the first side wall completely covers the second hole structure from an inside of the second bezel, and the second side wall completely covers the third hole structure from an inside of the second bezel.

13. The bezel assembly of claim 9, wherein the first bezel is made of plastic.

14. The bezel assembly of claim 9, wherein the second bezel is made of metal.

15. The bezel assembly of claim 9, wherein the third side wall is arc-shaped and both sides of the third side wall extend toward two non-parallel directions, respectively.

16. A display device comprising:
  a casing;
  a backlight module disposed in the casing, the backlight module comprising:
    a light guide plate;
    a first bezel having a first side wall and a second side wall, a first hole structure being formed on a corner between the first and second side walls, the light guide plate being disposed in the first bezel; and
    a second bezel having a third side wall, a second hole structure and a third hole structure being formed on opposite sides of the third side wall, wherein when the first bezel is disposed in the second bezel, the third side wall completely covers the first hole structure from an outside of the first bezel, and the second and third hole structures are close to the first hole structure; and
  a display panel disposed in the casing and over the backlight module.

17. The display device of claim 16, wherein a depth of the second hole structure is larger than or equal to a half of a height of the third side wall.

18. The display device of claim 16, wherein a depth of the third hole structure is larger than or equal to a half of a height of the third side wall.

19. The display device of claim 16, wherein the first side wall completely covers the second hole structure from an inside of the second bezel, and the second side wall completely covers the third hole structure from an inside of the second bezel.

20. The display device of claim 16, wherein the first bezel is made of plastic.

21. The display device of claim 16, wherein the second bezel is made of metal.

22. The display device of claim 16, wherein a corner of the light guide plate is exposed in the first hole structure.

23. The display device of claim 16, wherein the third side wall is arc-shaped and both sides of the third side wall extend toward two non-parallel directions, respectively.

* * * * *